(12) United States Patent
Sereboff

(10) Patent No.: US 8,799,175 B2
(45) Date of Patent: Aug. 5, 2014

(54) AUTOMATED INTELLECTUAL PROPERTY LICENSING

(71) Applicant: Steven C. Sereboff, Thousand Oaks, CA (US)

(72) Inventor: Steven C. Sereboff, Thousand Oaks, CA (US)

( * ) Notice: Subject to any disclaimer, the term of this patent is extended or adjusted under 35 U.S.C. 154(b) by 0 days.

(21) Appl. No.: 13/867,843

(22) Filed: Apr. 22, 2013

(65) Prior Publication Data

US 2013/0282617 A1 Oct. 24, 2013

Related U.S. Application Data

(60) Provisional application No. 61/637,379, filed on Apr. 24, 2012.

(51) Int. Cl.

| | | |
|---|---|---|
| *G06Q 50/00* | (2012.01) | |
| *G06Q 30/00* | (2012.01) | |
| *G06Q 40/00* | (2012.01) | |
| *G06F 21/00* | (2013.01) | |
| *G06Q 50/18* | (2012.01) | |
| *G06Q 40/06* | (2012.01) | |

(52) U.S. Cl.
CPC .............. *G06Q 50/184* (2013.01); *G06Q 40/06* (2013.01); *G06Q 50/00* (2013.01); *G06Q 30/00* (2013.01); *G06Q 40/00* (2013.01); *G06F 21/00* (2013.01)
USPC ...................... 705/310; 705/14.71; 705/14.73; 705/36 R; 705/37; 705/59

(58) Field of Classification Search
None
See application file for complete search history.

(56) References Cited

U.S. PATENT DOCUMENTS

| | | | | |
|---|---|---|---|---|
| 6,662,178 | B2* | 12/2003 | Lee | 1/1 |
| 6,904,417 | B2* | 6/2005 | Clayton et al. | 705/59 |
| 7,379,910 | B2* | 5/2008 | Abrahm et al. | 705/37 |
| 8,090,638 | B1* | 1/2012 | Amin et al. | 705/36 R |
| 8,095,441 | B2* | 1/2012 | Wu et al. | 705/35 |
| 8,180,713 | B1* | 5/2012 | Rigby et al. | 706/12 |
| 8,468,244 | B2* | 6/2013 | Redlich et al. | 709/225 |
| 8,572,083 | B1* | 10/2013 | Snell et al. | 707/736 |
| 8,606,746 | B2* | 12/2013 | Yeap et al. | 707/603 |
| 8,656,452 | B2* | 2/2014 | Li et al. | 726/1 |
| 2002/0002523 | A1* | 1/2002 | Kossovsky et al. | 705/36 |
| 2002/0007335 | A1* | 1/2002 | Millard et al. | 705/37 |
| 2002/0035571 | A1* | 3/2002 | Coult | 707/104.1 |
| 2002/0091991 | A1* | 7/2002 | Castro | 717/106 |
| 2002/0138419 | A1* | 9/2002 | Melone et al. | 705/38 |
| 2002/0165818 | A1* | 11/2002 | Meade, II | 705/39 |
| 2002/0169774 | A1* | 11/2002 | Greenbaum et al. | 707/9 |
| 2003/0036945 | A1* | 2/2003 | Del Vecchio et al. | 705/10 |

(Continued)

OTHER PUBLICATIONS

Amazon.com, Amazon Marketplace, an online marketplace that allows sellers to offer new and used items alongside Amazon's offerings, and customers to buy those items directly from the third party sellers using amazon.com's infrastructure. Website last accessed Jul. 11, 2013, http://www.amazon.com/b?ie=UTF8&node=3247953011.

(Continued)

*Primary Examiner* — Gregory Johnson
(74) *Attorney, Agent, or Firm* — SoCal IP Law Group LLP; Steven C. Sereboff

(57) ABSTRACT

There is disclosed a website that allows patent licenses to be easily purchased. Through the website, customers can purchase paid-up, lump-sum licenses from the vendors. The website employs standard forms that avoid risks of litigation and the burdens of negotiation.

10 Claims, 11 Drawing Sheets

(56) References Cited

U.S. PATENT DOCUMENTS

| | | | | |
|---|---|---|---|---|
| 2003/0120518 | A1* | 6/2003 | Galley | 705/4 |
| 2003/0212572 | A1* | 11/2003 | Poltorak | 705/1 |
| 2003/0229560 | A1* | 12/2003 | Bourassa et al. | 705/36 |
| 2004/0088332 | A1* | 5/2004 | Lee et al. | 707/200 |
| 2004/0243631 | A1* | 12/2004 | Walker et al. | 707/104.1 |
| 2005/0069096 | A1* | 3/2005 | Claudatos et al. | 379/88.08 |
| 2005/0108118 | A1* | 5/2005 | Malackowski et al. | 705/30 |
| 2005/0119962 | A1* | 6/2005 | Bowen et al. | 705/37 |
| 2005/0149401 | A1* | 7/2005 | Ratcliffe et al. | 705/14 |
| 2005/0165623 | A1* | 7/2005 | Landi et al. | 705/2 |
| 2005/0197857 | A1* | 9/2005 | Avery | 705/1 |
| 2005/0216399 | A1* | 9/2005 | Colvin | 705/39 |
| 2005/0246292 | A1* | 11/2005 | Sarcanin | 705/67 |
| 2006/0190296 | A1* | 8/2006 | Hackett et al. | 705/2 |
| 2006/0218101 | A1* | 9/2006 | Kim | 705/59 |
| 2007/0016520 | A1* | 1/2007 | Gang et al. | 705/38 |
| 2007/0038562 | A1* | 2/2007 | Hoerl et al. | 705/40 |
| 2007/0050264 | A1* | 3/2007 | Lewis | 705/26 |
| 2007/0061249 | A1* | 3/2007 | Newman | 705/37 |
| 2007/0073625 | A1* | 3/2007 | Shelton | 705/59 |
| 2007/0073748 | A1* | 3/2007 | Barney | 707/101 |
| 2007/0074169 | A1* | 3/2007 | Chess et al. | 717/126 |
| 2007/0100738 | A1* | 5/2007 | Mullendore | 705/37 |
| 2007/0174170 | A1* | 7/2007 | Gray | 705/36 T |
| 2007/0185817 | A1* | 8/2007 | Davis | 705/51 |
| 2007/0244837 | A1* | 10/2007 | Plow et al. | 705/36 R |
| 2007/0282619 | A1* | 12/2007 | Cheek | 705/1 |
| 2008/0005103 | A1* | 1/2008 | Ratcliffe et al. | 707/5 |
| 2008/0010279 | A1* | 1/2008 | Lykkehoy et al. | 707/6 |
| 2008/0140557 | A1* | 6/2008 | Bowlby et al. | 705/37 |
| 2008/0178302 | A1* | 7/2008 | Brock et al. | 726/32 |
| 2008/0262943 | A1* | 10/2008 | Mullendore | 705/26 |
| 2008/0281748 | A1* | 11/2008 | Newman | 705/37 |
| 2009/0012827 | A1* | 1/2009 | Avrunin | 705/7 |
| 2009/0043552 | A1* | 2/2009 | Tomlinson et al. | 703/6 |
| 2009/0119191 | A1* | 5/2009 | Stuart et al. | 705/30 |
| 2009/0228389 | A1* | 9/2009 | Meehan et al. | 705/37 |
| 2009/0234781 | A1* | 9/2009 | Malackowski et al. | 705/500 |
| 2009/0271274 | A1* | 10/2009 | Baunach | 705/14.73 |
| 2010/0023371 | A1* | 1/2010 | Hartz et al. | 705/10 |
| 2010/0138480 | A1* | 6/2010 | Benedetto | 709/203 |
| 2010/0153282 | A1* | 6/2010 | Graham | 705/310 |
| 2010/0195808 | A1* | 8/2010 | Kumar et al. | 379/88.13 |
| 2010/0205159 | A1* | 8/2010 | Li et al. | 707/694 |
| 2011/0029351 | A1* | 2/2011 | Intemann et al. | 705/9 |
| 2011/0099084 | A1* | 4/2011 | Horn et al. | 705/26.25 |
| 2011/0202420 | A1* | 8/2011 | Alrasheed | 705/26.2 |
| 2011/0246473 | A1* | 10/2011 | Stec | 707/741 |
| 2012/0028821 | A1* | 2/2012 | Jaenisch et al. | 506/9 |
| 2012/0089524 | A1* | 4/2012 | Nelson | 705/310 |
| 2013/0110710 | A1* | 5/2013 | Milone | 705/39 |
| 2013/0204799 | A1* | 8/2013 | Curtis | 705/310 |
| 2013/0238625 | A1* | 9/2013 | Binkowski et al. | 707/737 |
| 2013/0282409 | A1* | 10/2013 | Lundberg et al. | 705/4 |
| 2014/0032444 | A1* | 1/2014 | Dunne et al. | 705/36 R |

OTHER PUBLICATIONS iStockphoto.com, About Us, iStockphoto is an online, royalty free, international micro-stock photography provider operating with the micro-payment business model. Images cost between 1 and 150 credits, depending on size and image collection. Website last accessed Jul. 11, 2013, http://www.istockphoto.com/help/about-us.

\* cited by examiner

AUTOMATED INTELLECTUAL PROPERTY LICENSING

RELATED APPLICATION INFORMATION

This patent claims priority from Provisional Application No. 61/637,379 filed Apr. 24, 2012, entitled "AUTOMATED INTELLECTUAL PROPERTY LICENSING".

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to licensing of intellectual property rights.

2. Description of the Related Art

Traditional patent licensing has heavy transaction costs. The patent owner must identify prospective licensees, and then must convince the prospective licensees to enter into negotiations, and then the seller and buyer must negotiate. Both sides are usually represented by patent counsel and litigators who analyze the merits of the patent, analyze whether the patent covers the buyer's products, and evaluate likelihood of success in litigation. The seller's counsel usually prepares a custom license agreement for each transaction. Attorneys on both sides usually negotiate the deal points as well as the specifics of the contract.

The traditional patent licensing model makes sense if the purchase price is $50,000 or higher. But if the price is lower than $50,000, the transaction costs for each side become material to the price. For this reason it can be very difficult to pursue licenses priced at under $10,000. Yet many patent owners want to sell licenses for less than $10,000.

Nobody thinks patent litigation is cheap. Every two years, the American Intellectual Property Law Association (AIPLA) issues its Report of the Economic Survey, which includes statistics about the cost of patent litigation. According to the 2011 report, for patent infringement litigation in which there was less than $1,000,000 at risk, the average total cost of litigation was almost $1,000,000; where there was between $1,000,000 and $25,000,000 at risk, the average total cost of litigation was almost $3,000,000; and where there was greater than $25,000,000 at risk, the average total cost of litigation was over $6,000,000. The 2011 report follows decades of clear upward trends in litigation costs.

Patent litigation is slow, too. It usually takes about one to two years to get a district court decision. An appeal almost always follows because the cost of the appeal is so small compared to the value of the case. Appeal adds another year, and frequently results in a remand to the district court to reconsider some issues or even for a new trial.

While a patent lawsuit is pending, a business can grow, shrink, merge, spin off and dissolve. The rapid pace of technology and the speed of upward and downward market changes also can dramatically increase or decrease the value of patent liability while a case is pending. Thus, patent cases are often expensive distractions to the ordinary course of business.

Most patent litigation starts when the patent owner files a lawsuit. When a patent owner becomes aware of an infringer, the owner can simply wait until he pleases to bring an infringement suit. Meanwhile, the monetary damages continuously accrue—with no effort expended by the patent owner. If the patent owner has sent a notice letter to the infringer, the infringer can accrue additional liability as a willful infringer.

The Declaratory Judgment Act balances power between the patent owner and the accused infringer. Under the Declaratory Judgment Act, a company can file a declaratory judgment (DJ) action to "clear the air" about whether it is infringing. Prior to 2007, an accused infringer could file a DJ action only when faced with an express threat of litigation. That changed with the Supreme Court's Medimmune decision. Since then, anyone can file a DJ action against a patent owner if they can show there is a "case or controversy." In general, establishing the existence of a case or controversy for purposes of declaratory judgment jurisdiction requires something more than just a communication from a patent owner to another party, merely identifying its patent and the other party's product line. How much more is determined on a case-by-case basis. However, the courts have authorized DJ jurisdiction because the patent owner offered a license to the plaintiff.

Though patent owners can be bullies, sometimes the Declaratory Judgment Act makes patent owners the victims of bullying.

In an online software marketplace, a software developer makes their software available for download from the marketplace. The marketplace makes the software available for download to customers. Customers go to the marketplace, select the software to be downloaded, pay electronically (e.g., credit card or Pay Pal), and then are able to download the software. The customers do not own the software—it is provided under license.

DESCRIPTION OF THE DRAWINGS

FIG. 5 is a webpage of a qualification of a customer representative.

FIG. 10 is a webpage of a fifth view of a virtual data room.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

There is disclosed a website that allows patent licenses to be purchased as easily as downloaded software from an online retailer. The website interacts with two classes of parties: "vendors" are patent owners who wish to sell patent licenses; "customers" are companies that may have present or future liability for infringing the vendor's patent(s), and may wish to purchase a patent license from the vendor.

Through the website, customers can purchase paid-up, lump-sum licenses from the vendors. The website employs standard forms that ensure no hassles, no haggling, no strings and no worries. For a very low price the customer gets a full and fair license.

At the start of negotiations, the customer enters into a safe harbor agreement with the vendor. The safe harbor agreement provides confidentiality and a mutual agreement not to file lawsuits, thereby allowing the customer and the vendor to proceed with the transaction with greater comfort. The safe harbor for a customer is that the patent owner promises not to sue the customer, there is a non-disclosure agreement with extensions from Federal Rule of Civil Procedure 408, there is a promise that the license agreement offered will include fair terms, and a promise that the vendor will offer a low license price. The safe harbor for a vendor is that the vendor has no worry about being sued for declaratory judgment, there is a non-disclosure agreement with extensions from Federal Rule of Civil Procedure 408, and that the licensing can be sold without negotiation.

Figure 1:
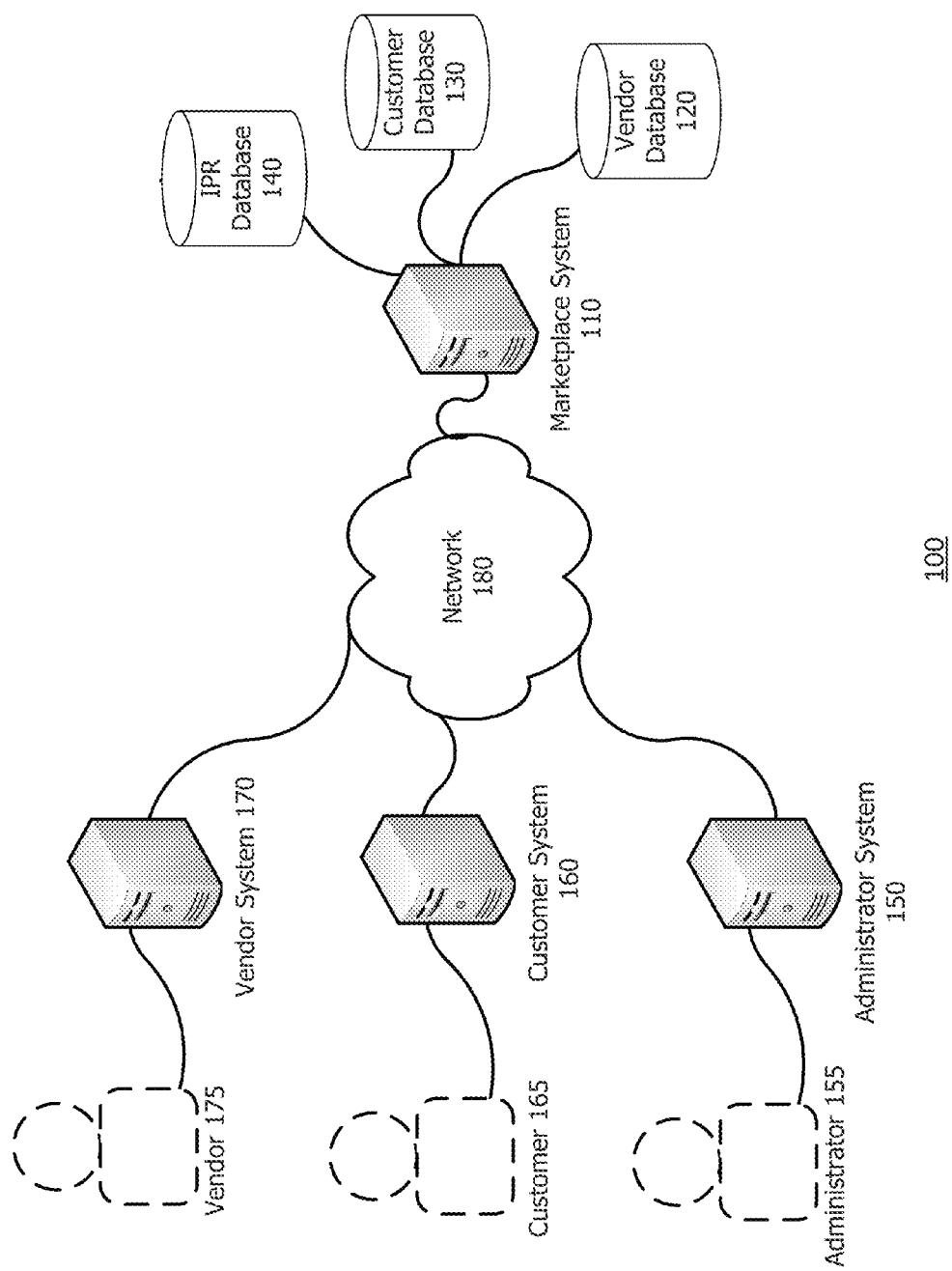
FIG. 1 is a block diagram of an environment for automated intellectual property licensing.

Referring now to FIG. 1, there is shown a block diagram of an environment 100 for automated intellectual property licensing. The environment 100 includes a computerized marketplace system 110, vendor systems such as the vendor system 170, customer systems such as customer system 160, an administrator system 150, and a network 180 for interconnecting the marketplace system 110 to the vendor systems, customer systems and administrator system 150.

Various users (i.e., people) may operate aspects of the environment 100, including a vendor representative 175 of the vendor system 170, a customer representative 165 of the customer system 160, and an administrator 155 of the administrator system 150. Each of these users may have secure access and control over their respective systems. Furthermore, users may obtain the functionality hereof through non-specified devices having the capability of performing the functionality described herein.

The marketplace system 110 may be a computer system having server software such as web server software. The marketplace system 110 may include one or more databases, such as a vendor database 120, a customer database 130 and an intellectual property right (IPR) database 140. The partitioning of the databases 120, 130, 140 into the three functional units as shown is for ease of discussion and does not imply a corresponding physical division or structure. Though described as part of the marketplace system 110, For example, the databases 120, 130, 140 may be stored elsewhere or otherwise distributed.

The vendor system 170, which is representative of a number of vendor systems, the customer system 160, which is representative of a number of customer systems, and the administrator system 150, may be computer systems and may include web browser software which allow them to browse to the marketplace system 110 and engage in transactions with the marketplace system 110.

The network 180 is a data network, and may be or include the Internet. The network 180 and the systems communicating through the network 180 may support secure communications with the marketplace system 110.

The vendor database 120 stores records corresponding to prospective and actual vendors. The vendor records may have fields including: a name of the vendor, a user ID and password for the vendor for logging into the marketplace system 110, the place of residence (e.g., state of incorporation) of the vendor, vendor mailing address, other contact information for the vendor such as an email address, a unique vendor ID (which may be the same as the user ID), a name of a person with authority to act on behalf of the vendor, plus the title, contact information and login information for that person.

The customer database 130 stores records corresponding to prospective and actual customers. The customer records may have fields including: name of the customer, the place of residence (e.g., state of incorporation) of the customer, customer mailing address, other contact information for the customer such as an email address, a customer ID and a password for logging into the marketplace system 110. The customer record may also include a name of a person with authority to act on behalf of the customer, plus the title, contact information and login information for that person.

The IPR database 140 stores records for intellectual property rights of the vendors which are available for licensing to the customers. The IPR records may have fields including: an identification of the intellectual property right, a description of the intellectual property right, and a scope of the intellectual property right. If the IPR is a patent, then the identification might be the patent number and country of issue, the description might be the patent itself, and the scope might be a claim chart showing how at least one claim reads on a generic product or service.

The databases 120, 130, 140 may store other data and relations. The marketplace system 110 may store in the databases data arising from transactions, such as safe harbor agreement acceptance and license agreement acceptance. When a customer accepts the safe harbor agreement, the data stored may include the customer ID, the date the customer accepted the safe harbor agreement, the vendor ID of the vendor on the safe harbor agreement, version of the safe harbor agreement accepted, and a system-generated serial number for the safe harbor agreement. When a customer accepts the license agreement, the data stored may include the customer ID, the date the customer accepted the license agreement, the vendor ID of the vendor on the license agreement, version of the license agreement accepted, a system-generated serial number for the license agreement, a price paid for the license. Other relative data may include associations between the vendors and the intellectual property rights, associations between the customers and the intellectual property rights, and pricing indicia for licensing the intellectual property rights to the customers. The pricing indicia may be in the form of a fixed price in a customer record applicable to all IPR license purchases, various fixed prices for different IPR purchases, pricing levels for the customer, or values of one or more variables which may be used in a formula to set a price.

Figure 2:
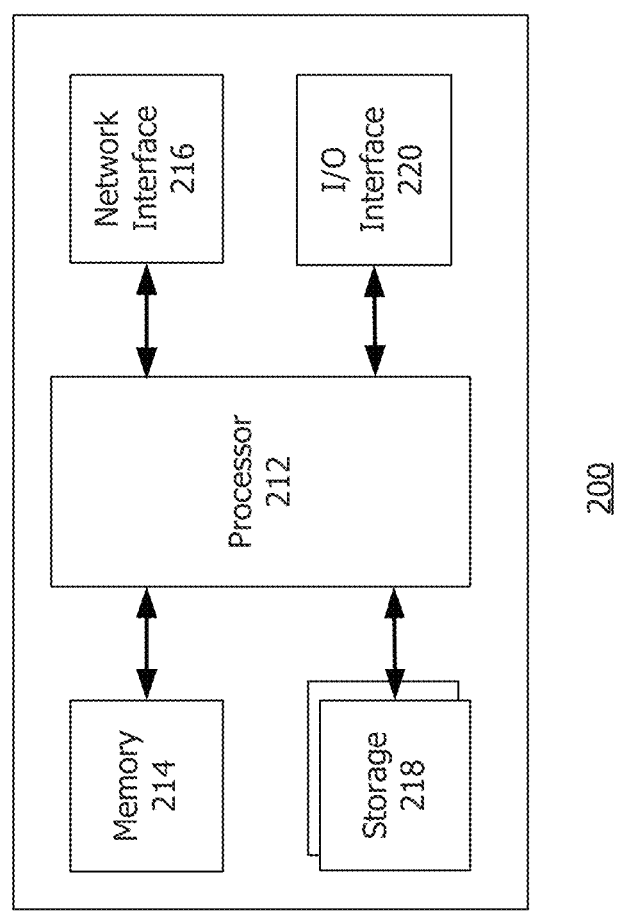
FIG. 2 is a block diagram of a computing device.

Turning now to FIG. 2 there is shown a block diagram of a computing device 200, which is representative of the marketplace system 110, the vendor systems, the customer systems and the administrator system 150 in FIG. 1. The computing device 200 may be, for example, a desktop or laptop computer, a server computer, a tablet or other mobile device. The computing device 200 may include software and/or hardware for providing functionality and features described herein. The computing device 200 may therefore include one or more of: logic arrays, memories, analog circuits, digital circuits, software, firmware and processors. The hardware and firmware components of the computing device 200 may include various specialized units, circuits, software and interfaces for providing the functionality and features described herein.

The computing device 200 has a processor 212 coupled to a memory 214, storage 218, a network interface 216 and an I/O interface 220. The processor 212 may be or include one or more microprocessors, field programmable gate arrays (FPGAs), application specific integrated circuits (ASICs), programmable logic devices (PLDs) and programmable logic arrays (PLAs).

The memory 214 may be or include RAM, ROM, DRAM, SRAM and MRAM, and may include firmware, such as static data or fixed instructions, BIOS, system functions, configuration data, and other routines used during the operation of the computing device 200 and processor 212. The memory 214 also provides a storage area for data and instructions associated with applications and data handled by the processor 212.

The storage 218 provides non-volatile, bulk or long term storage of data or instructions in the computing device 200. The storage 218 may take the form of a magnetic or solid state disk, tape, CD, DVD, or other reasonably high capacity addressable or serial storage medium. Multiple storage devices may be provided or available to the computing device 200. Some of these storage devices may be external to the computing device 200, such as network storage or cloud-based storage. As used herein, the term storage medium corresponds to the storage 218 and does not include transitory media such as signals or waveforms. In some cases, such as those involving solid state memory devices, the memory 214 and storage 218 may be a single device.

The network interface 216 includes an interface to a network such as the network 180 (FIG. 1). The network interface 216 may be wired or wireless.

The I/O interface 220 interfaces the processor 212 to peripherals (not shown) such as displays, keyboards and USB devices.

Figure 3:
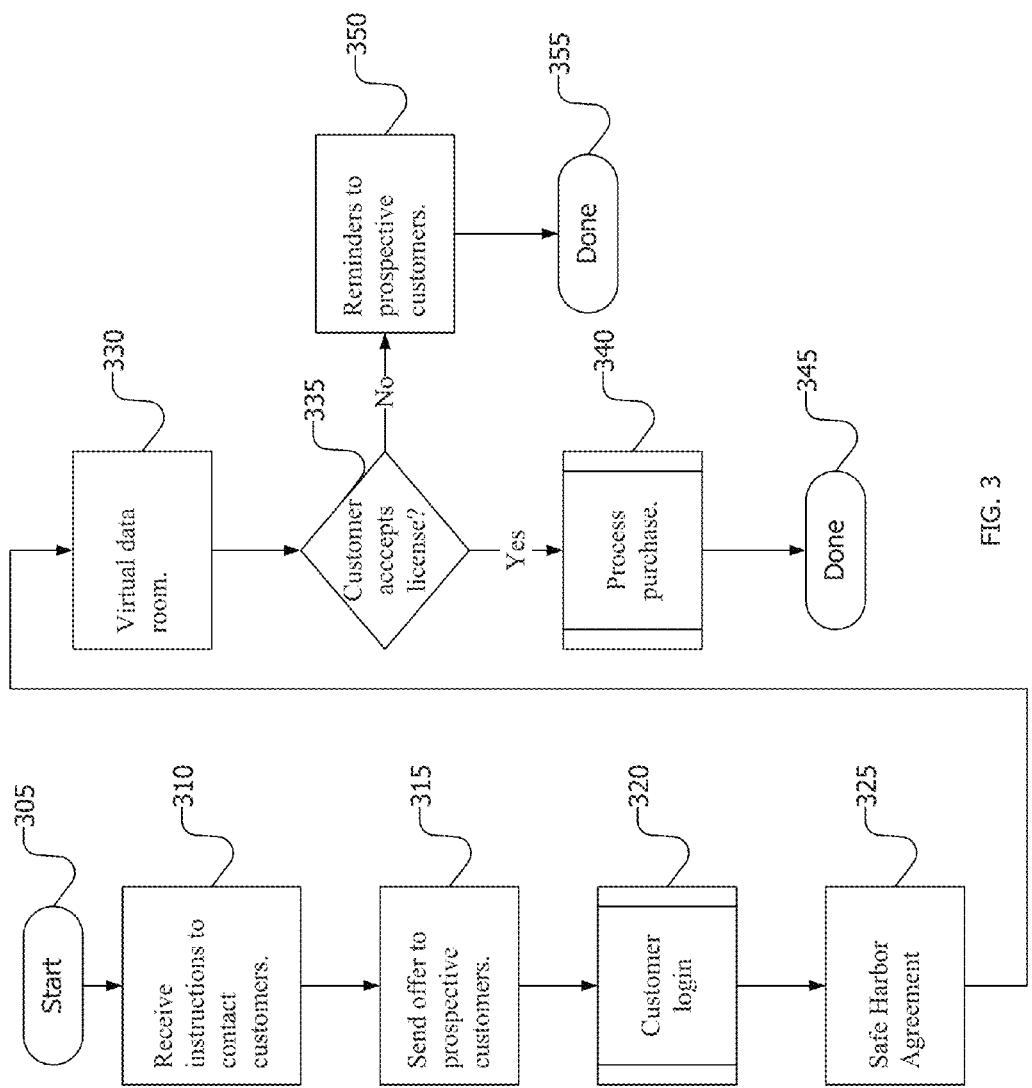
FIG. 3 is a flowchart of a method of automated intellectual property licensing.

Referring now to FIG. 3 there is shown a flowchart of a method of automated intellectual property licensing. The method may use the environment 100 of FIG. 1, and in particular the marketplace system 110. The flow chart has both a start 305 and ends 345, 355, but the process is cyclical in nature.

As a predicate, the marketplace system may have its vendor database, customer database and IPR database at least partially populated. The administrator may initially create records for each vendor, although vendors may be permitted to create their own records. Vendors may be permitted to edit their records, and may be permitted to create records for their prospective customers and intellectual property rights. The vendors may provide lists of prospective customers to the marketplace system, for example in a spreadsheet form, and this data may be imported into the databases. The administrator may provide assistance to the vendors.

A vendor representative may log into the marketplace system and select an IPR for licensing, and select customers to solicit (step 310). The marketplace system may provide an appropriate user interface that allows the vendor representative to select only the customer records and the IPR records associated with the selected vendor. IPR for licensing may be selected from the IPR database at the time of selecting customers, or IPR may be associated with customer records at some other time. Once the vendor has selected customers and IPR, the vendor may provide instructions to the marketplace system to initiate communications for licensing the selected IPR with the selected customers. The customer record may include a field through which the vendor decides when to initiate these communications. In conjunction with the vendor selecting customers and IPR, the vendor agrees that it accepts the safe harbor agreement and license agreement with the selected customers and for the selected IPR, such that the safe harbor agreement and the license agreement can become effective upon acceptance by the those customers on the terms specified by the vendor.

The marketplace system may then cause separate written communications to be sent to the selected customers (step 315). The marketplace system may use the stored customer contact information to address the written communications. The written communicates may be letters sent by postal mail, and the marketplace system may interoperate with an automated print and mail service so that letters to the customers may be mailed once the vendor has selected customers. Alternatively or in addition to printed letters, the marketplace system may send the written communication as email or fax to the selected customers using address information in the customer database.

Figure 4:
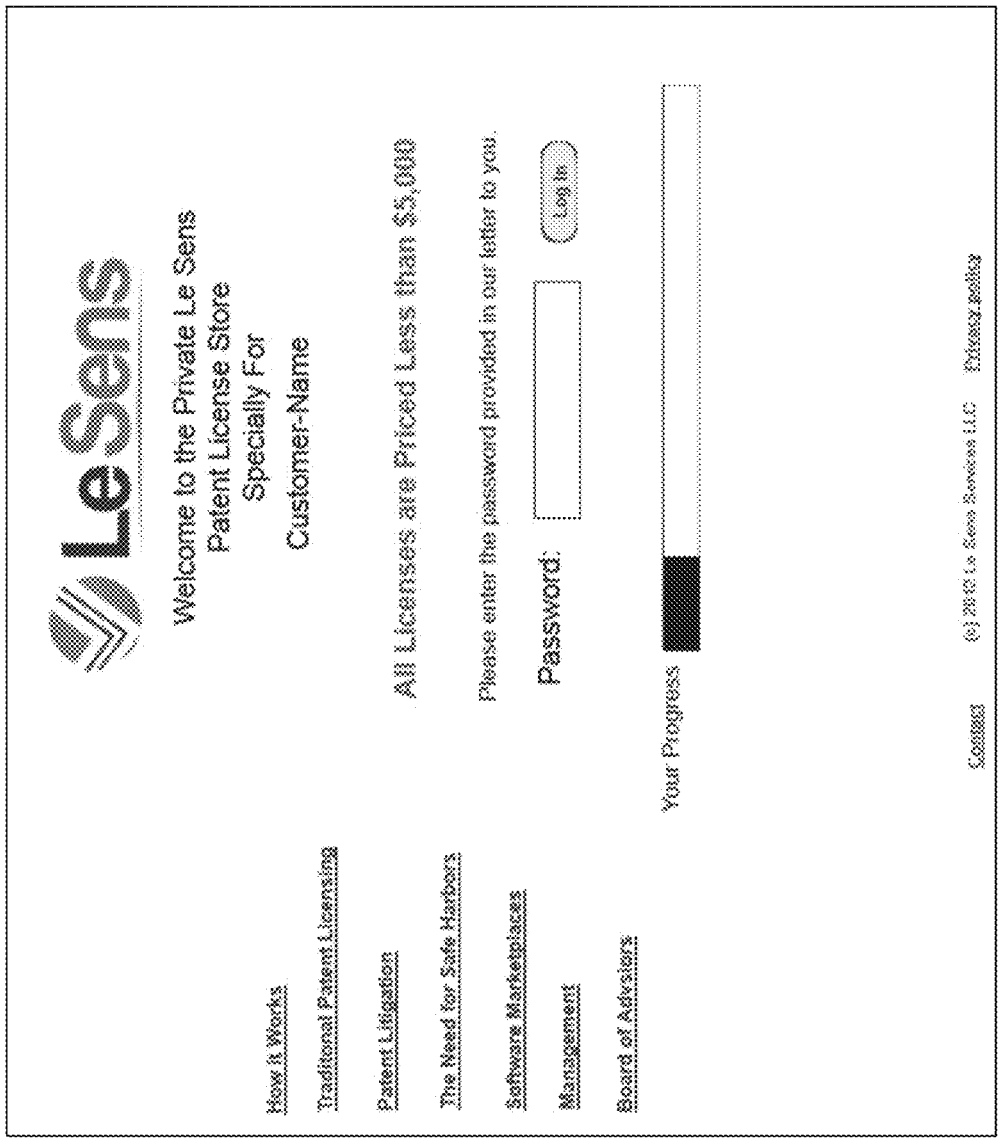
FIG. 4 is a webpage for a customer's initial login.
Figure 6:
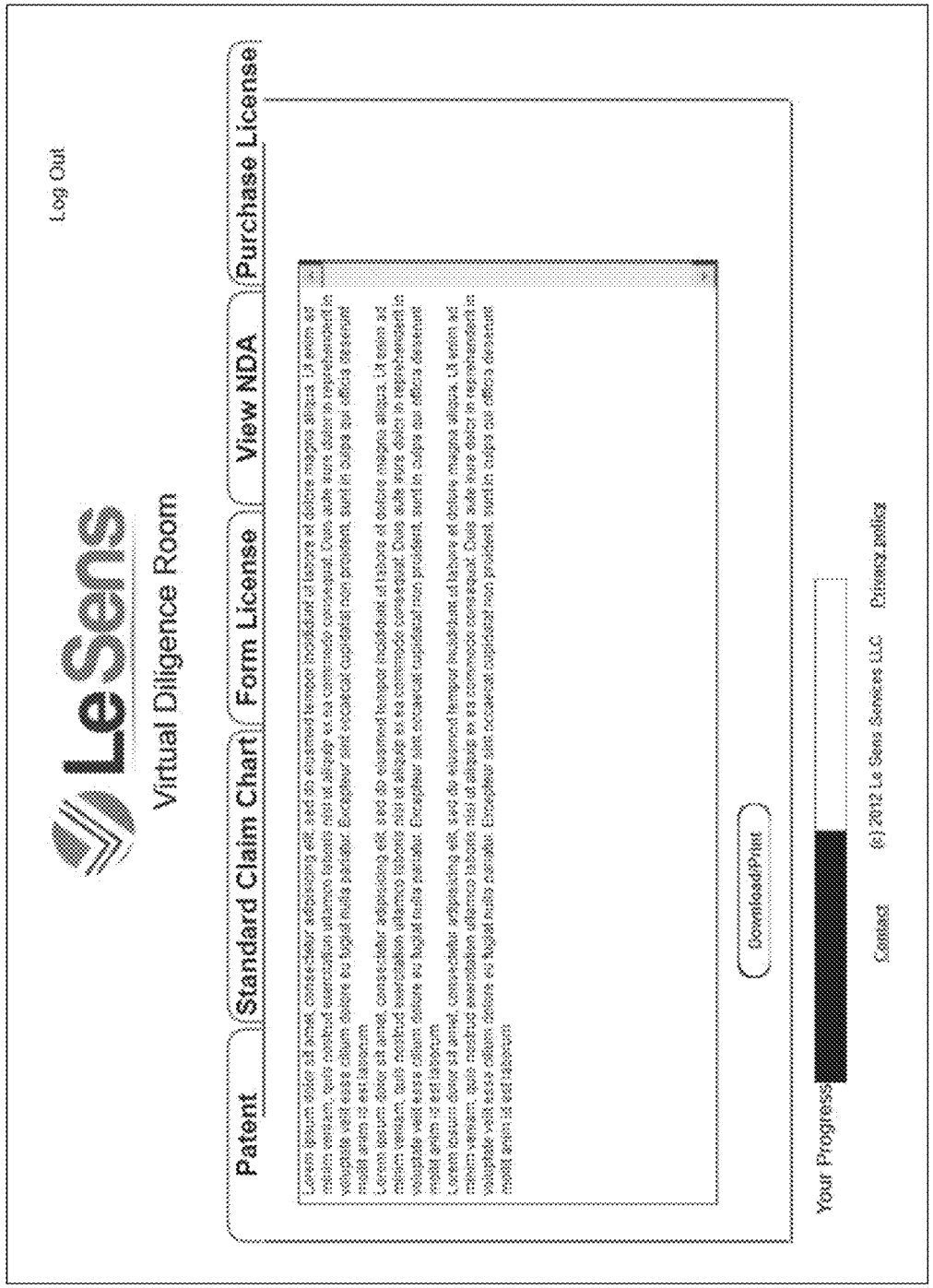
FIG. 6 is a webpage of a first view of a virtual data room.

The written communication to each selected customer expresses an offer for the selected customer to purchase an IPR license. The written communication does not identify the selected IPR or the vendor. The written communication invites the customer to log into the marketplace system according to instructions provided therein. The instructions to each customer may include the login information from the corresponding customer record. For example, the customer may be provided a URL which incorporates the customer ID in that customer's record, and a webpage such as that shown in FIG. 4 may be shown. Alternatively the customer may be permitted to go to the marketplace system's website and log in using credentials provided in the letter.

Figure 5:
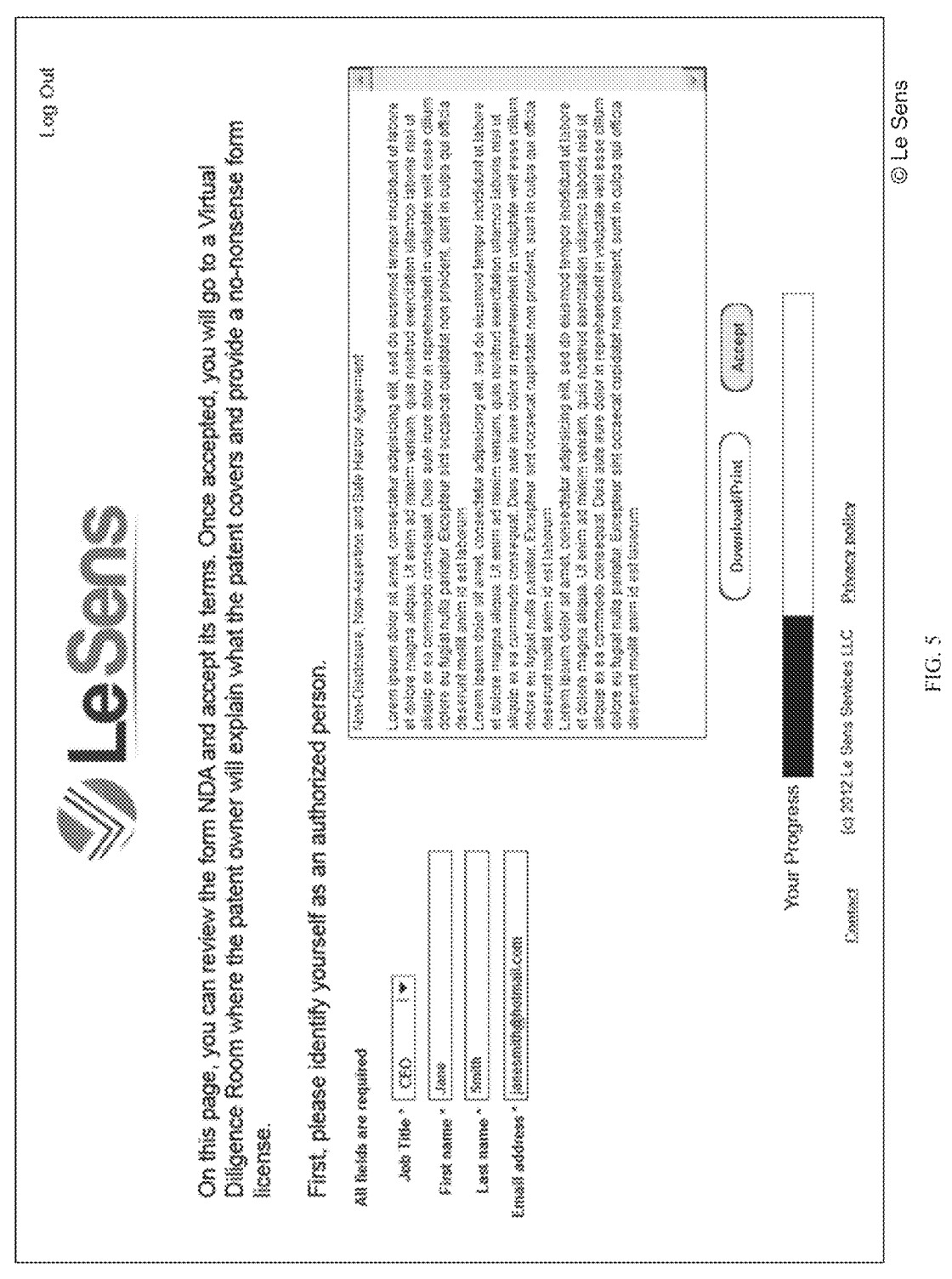

A customer representative may then log into the marketplace system as urged in the written communication (step 320). The login may be performed by an individual acting on behalf of the customer, and the marketplace system may at the outset require that the individual establish proper credentials for acting on behalf of the customer. The marketplace system may display a webpage such as that shown in FIG. 5, which requires the individual to select a job title which has apparent authority to act on behalf of the customer, plus the individual's name and email address. The individual may also be asked to provide a password for later logins to the marketplace system. In this way a single customer may have a number of representatives who can act on behalf of the customer in using the marketplace system.

After the customer representative logs in, the marketplace system may check whether the customer has accepted the safe harbor agreement. If not then the marketplace system offers the customer the safe harbor agreement (step 325). The marketplace system may track which version of the safe harbor agreement has been accepted by the customer, as well as a date of acceptance and a serial number, all of which may be stored in the customer record or in association with the customer record. The marketplace system may offer the safe harbor agreement without revealing the identification of the selected IPR or the name of the vendor to the customer. In this way the vendor may be protected from a declaratory judgment lawsuit.

The marketplace system may then receive the customer representative's acceptance of the safe harbor agreement. This may be performed using accepted legal procedures, such as by displaying the safe harbor agreement and then allowing the customer representative to click on a button which says "accept." Prior to acceptance, the customer representative may be permitted to download or print the safe harbor agreement, though as mentioned this will be a version which does not identify the vendor or the IPR. After acceptance, the marketplace system may provide the customer with a copy of the accepted safe harbor agreement including the customer name, the vendor name, the place of residence or state of incorporation of the vendor and the customer, a date of acceptance and a serial number. The marketplace system may automatically generate the date and the serial number and store them in association with the customer record. The marketplace system may email the accepted safe harbor agreement to the customer, may provide on-screen viewing, or a download function. The accepted copy of the safe harbor agreement may be a non-editable, image-type document, such as a pdf.

Figure 7:
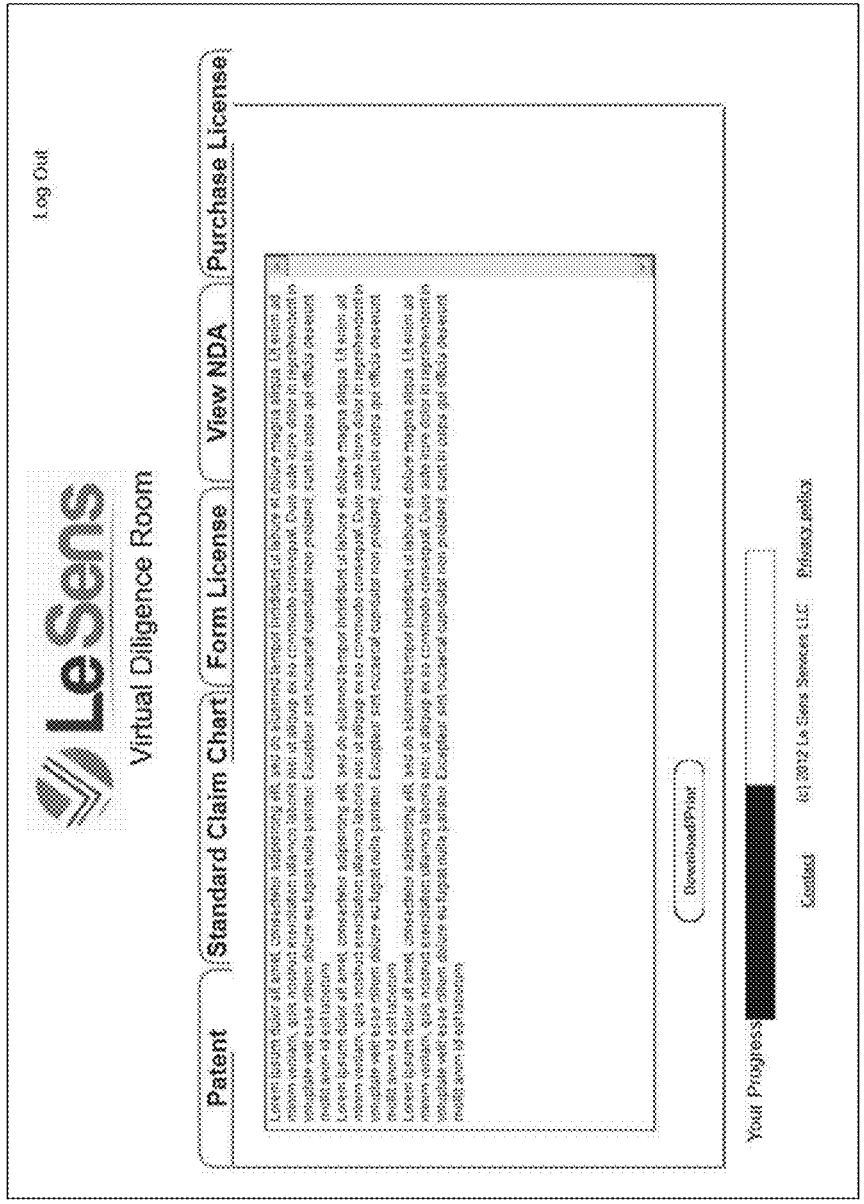
FIG. 7 is a webpage of a second view of a virtual data room.
Figure 8:
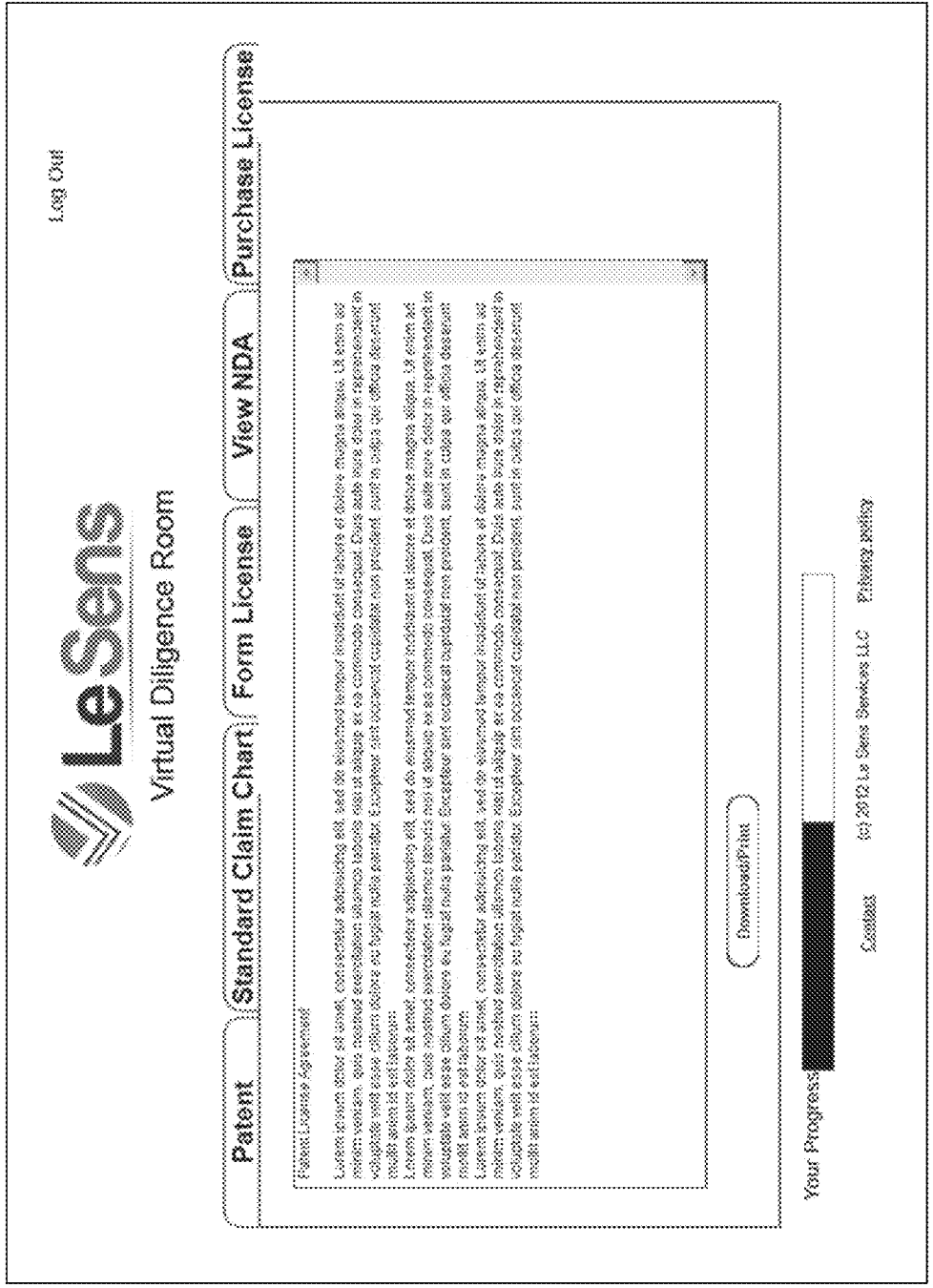
FIG. 8 is a webpage of a third view of a virtual data room.
Figure 9:
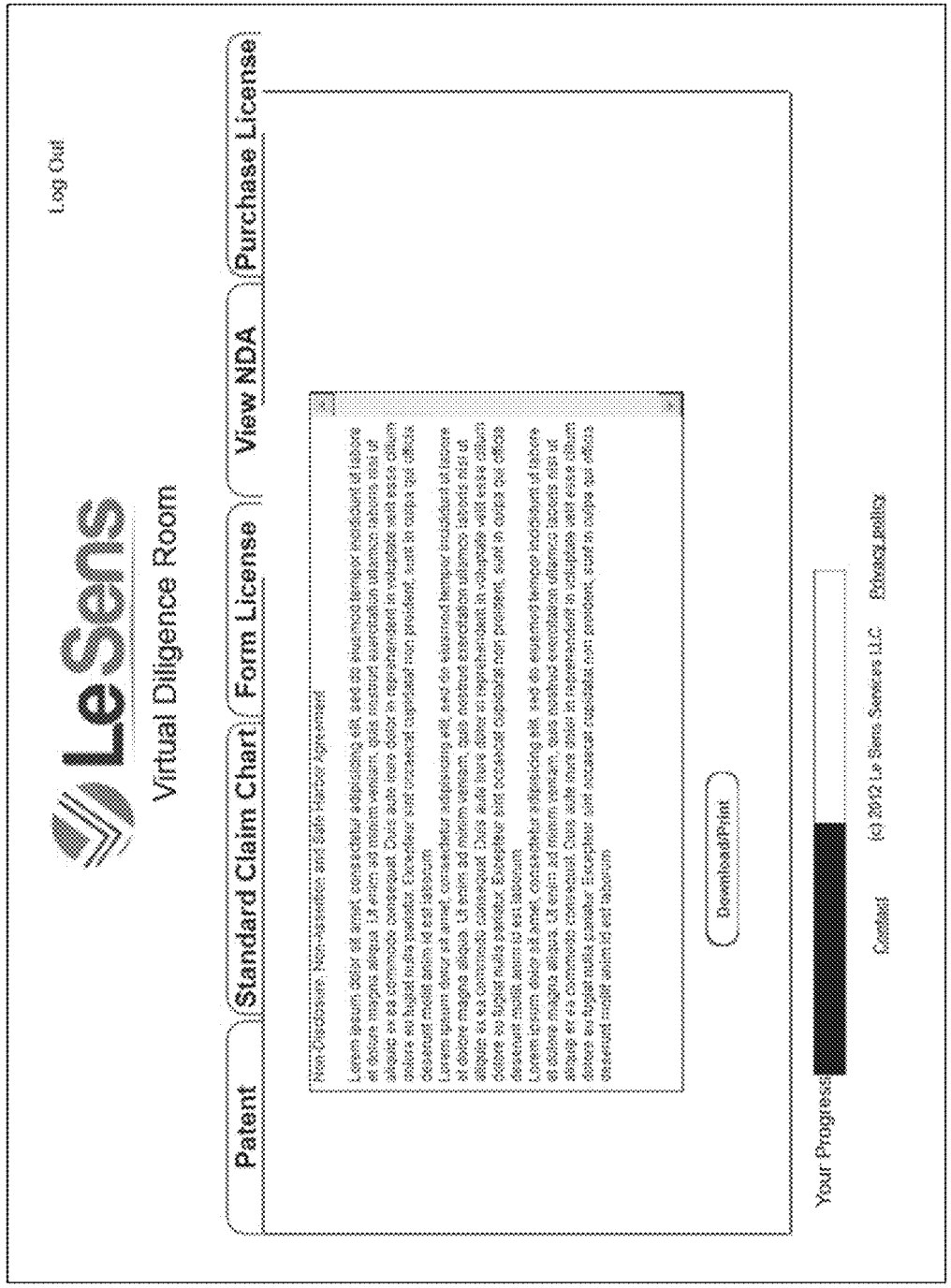
FIG. 9 is a webpage of a fourth view of a virtual data room.
Figure 10:
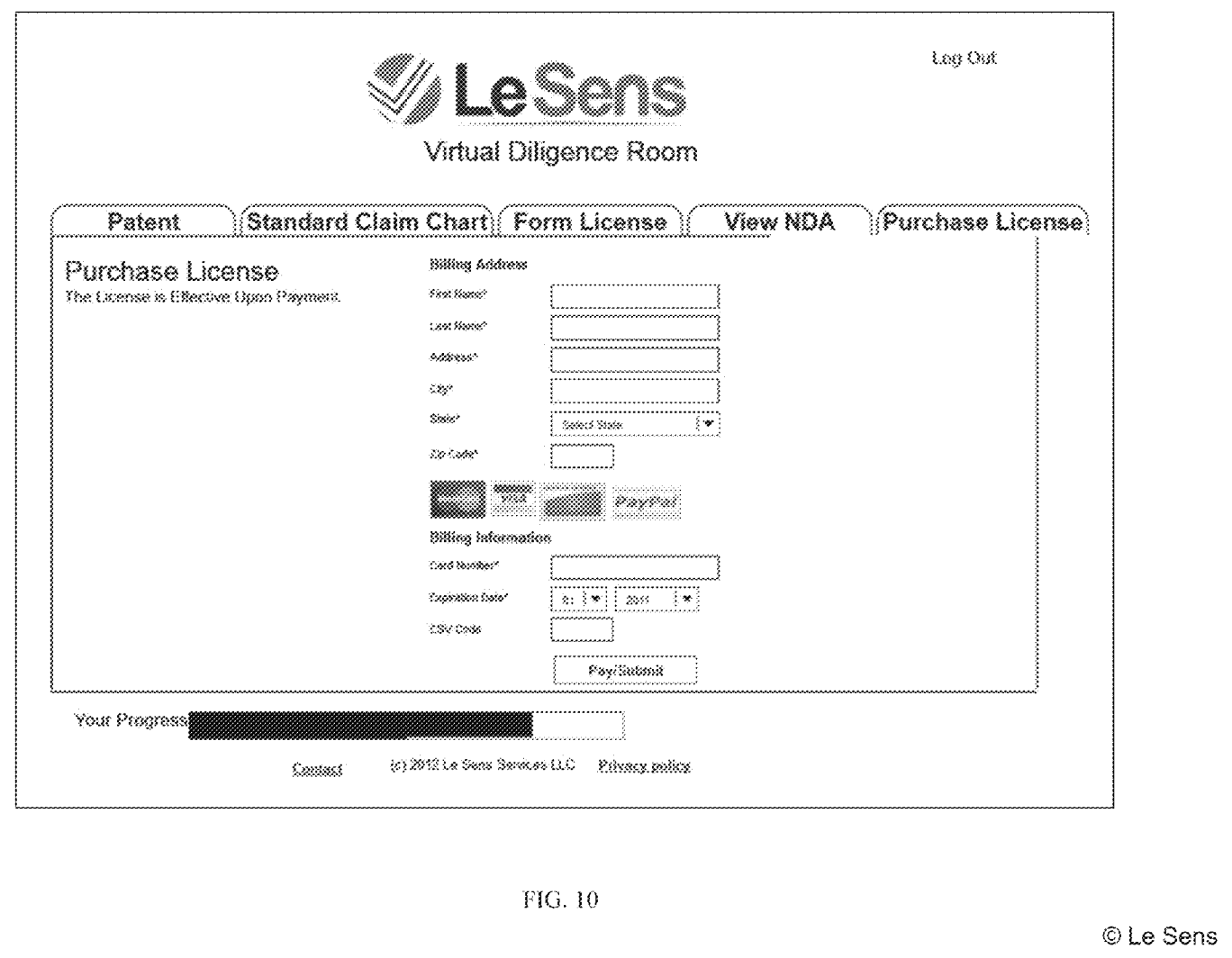

After the customer has accepted the safe harbor agreement, the marketplace system may provide the customer representative with access to a virtual data room (VDR), as shown in FIGS. 6, 7, 8 and 9. From the VDR the customer can learn about the IPR and what it might cover, and review a form license agreement. The VDR may include data from the IPR record, including the identification of the IPR and its description (FIG. 6), and the scope of the IPR (FIG. 7). The VDR may also include a form license agreement (FIG. 8), a facility for viewing and downloading the accepted safe harbor agreement (FIG. 9), and an offer to purchase a license of the IPR from the vendor at a specified price (FIG. 10). The specified price may be based upon the pricing indicia relations for the IPR and the customer. Within the VDR the customer will have an opportunity to perform due diligence on the license offer. The marketplace system may provide customer representatives with the ability to log out and log back in, and upon login back in the customer representative would resume from the last position for that customer.

Figure 11:
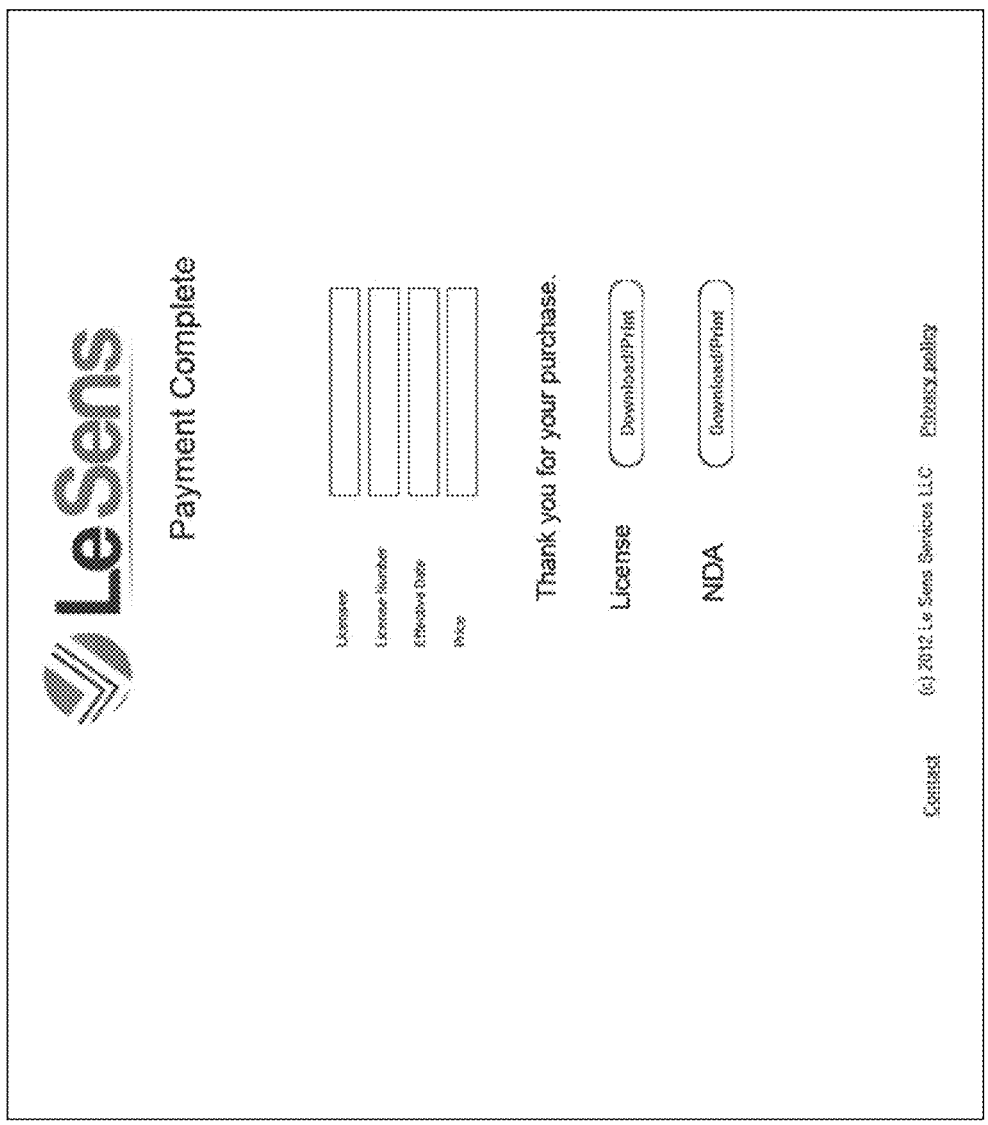
FIG. 11 is a webpage of payment completion.

The license agreement may become effective immediately upon payment. If the marketplace system receives the customer representative's acceptance of the license agreement and payment of the purchase price (step 335, FIG. 10), the marketplace system may then provide the customer with a copy of the license agreement including the customer's name, the vendor's name, the places of residence of the vendor and the customer, a date of acceptance, the identification of the IPR and a serial number (FIG. 11). The marketplace system may automatically generate the date and the serial number and store them in association with the customer record. The marketplace system may provide a facility for downloading the accepted license agreement, and may email it to the customer. Customer representatives may log into the marketplace later and access or download the accepted safe harbor agreement and the accepted license agreement. The accepted copy of the license agreement may be a non-editable, image-type document, such as a pdf.

The marketplace system may allow a customer to pay for a license agreement in installments. The vendor will determine whether to allow the customer this option, and the installment structure. This data may be variously included in the customer records, vendor records and IPR records.

If the customer does not purchase the license, the marketplace system may send reminders (step 350). The reminders may be sent to the customer itself or to the customer's representatives. The marketplace system may automatically send follow-up letters (e.g., via the online print/mail service) to customers to urge them to visit the marketplace system website if they have not already done so. If a customer representative has viewed the safe harbor agreement and entered contact info, but has not accepted the safe harbor agreement, the marketplace system may send reminders to the customer representative to urge him to return to the marketplace system website to accept the safe harbor agreement and consider the license offer. If the customer has accepted the safe harbor agreement but not yet bought a license, the marketplace system may send automatic reminders to the customer.

After the customer has made a purchase, the marketplace system may process the purchase by making an automated payment to the vendor (step 340). The marketplace system may utilize instructions in the vendor record for how to make payments to the vendor. The payment to the vendor may be automated, such as via ACH or an online payment system.

If a customer representative leaves the marketplace system, upon subsequent login the customer representative should be returned to where he left off.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of operating a computerized marketplace system comprising the computerized marketplace system receiving instructions from a vendor to initiate communications for licensing an intellectual property right with plural customers, wherein the vendor is selected from a vendor database, the vendor database has stored for each of plural vendors: a name of the vendor, the intellectual property right is selected from an intellectual property right database, the intellectual property right database has stored for each of plural intellectual property rights: an identification of the intellectual property right, a description of the intellectual property right, and a scope of the intellectual property right, the customers are selected by the selected vendor from a customer database, the customer database has stored for each of plural customers: a name of the customer, and contact information for the customer, and the vendor database, the intellectual property database and the customer database have relations which provide associations between the vendors and the intellectual property rights,
associations between the customers and the intellectual property rights, and
pricing indicia for licensing the intellectual property rights to the customers;

the computerized marketplace system causing separate written communications to be sent to the selected customers in accordance with the stored customer contact information, wherein the written communication to each selected customer expresses an offer for the selected customer to purchase a license without identifying the selected intellectual property right or the selected vendor, wherein the written communication includes instructions for the selected customer to log into the computerized marketplace system;

if a given customer logs into the computerized marketplace system, the computerized marketplace system checking if the given customer has accepted a safe harbor agreement, and if not then offering the given customer the safe harbor agreement, wherein
the safe harbor agreement includes mutual promises of confidentiality and mutual promises to not file lawsuits, and
offering the safe harbor agreement is performed without showing to the given customer the identification of the selected intellectual property right or the selected vendor;

the computerized marketplace system receiving the given customer's acceptance of the safe harbor agreement;

the computerized marketplace system providing the given customer with a copy of the accepted safe harbor agreement including the given customer name, the selected vendor name and a date of acceptance;

after the given customer has accepted the safe harbor agreement, the computerized marketplace system providing the given customer with access to a virtual data room, wherein the virtual data room includes the identification of the selected intellectual property right, the description of the selected intellectual property right, the scope of the selected intellectual property right, a form license agreement, and an offer to purchase a license of the selected intellectual property right from the selected vendor at a price based upon the pricing indicia relations for the selected intellectual property right and the given customer; and the computerized marketplace system receiving the given customer's acceptance of the license agreement and payment of the purchase price, and then the computerized marketplace system providing the given customer with a copy of the license agreement including the vendor's name, a date of acceptance, and the identification of the selected intellectual property right.

2. The method of claim 1 wherein the accepted safe harbor agreement includes a serial number.

3. The method of claim 1 wherein the accepted license agreement includes a serial number.

4. The method of claim 1 comprising the computerized marketplace system making an automated payment to the selected vendor for the given customer's purchase, wherein the vendor database stores instructions for how to make payments to the vendors.

5. The method of claim 1 wherein the vendor database stores a place of residence of each vendor, the method comprising including the place of residence of the selected vendor in the copy of the safe harbor agreement and the copy of the license agreement.

6. Apparatus comprising a nontransitory storage medium storing a marketplace system program having instructions which when executed by one or more processors will cause the processors to operate a computerized marketplace, the instructions of the marketplace system program for:

receiving instructions from a vendor to initiate communications for licensing an intellectual property right with plural customers, wherein
the vendor is selected from a vendor database,
the vendor database has stored for each of plural vendors: a name of the vendor,
the intellectual property right is selected from an intellectual property right database,
the intellectual property right database has stored for each of plural intellectual property rights: an identification of the intellectual property right, a description of the intellectual property right, and a scope of the intellectual property right,
the customers are selected by the selected vendor from a customer database,
the customer database has stored for each of plural customers: a name of the customer, and contact information for the customer, and
the vendor database, the intellectual property database and the customer database have relations which provide
associations between the vendors and the intellectual property rights,
associations between the customers and the intellectual property rights, and
pricing indicia for licensing the intellectual property rights to the customers;

causing separate written communications to be sent to the selected customers in accordance with the stored customer contact information, wherein the written communication to each selected customer expresses an offer for the selected customer to purchase a license without identifying the selected intellectual property right or the selected vendor, wherein the written communication includes instructions for the selected customer to log into the computerized marketplace system;

checking if a given customer has accepted a safe harbor agreement, and if not then offering the given customer the safe harbor agreement, wherein
the safe harbor agreement includes mutual promises of confidentiality and mutual promises to not file lawsuits, and
offering the safe harbor agreement is performed without showing to the given customer the identification of the selected intellectual property right or the selected vendor;

receiving the given customer's acceptance of the safe harbor agreement;

providing the given customer with a copy of the accepted safe harbor agreement including the given customer name, the selected vendor name and a date of acceptance;

after the given customer has accepted the safe harbor agreement, providing the given customer with access to a virtual data room, wherein the virtual data room includes the identification of the selected intellectual property right, the description of the selected intellectual property right, the scope of the selected intellectual property right, a form license agreement, and an offer to purchase a license of the selected intellectual property right from the selected vendor at a price based upon the pricing indicia relations for the selected intellectual property right and the given customer; and receiving the given customer's acceptance of the license agreement and payment of the purchase price, and then providing the given customer with a copy of the license agreement including the vendor's name, a date of acceptance, and the identification of the selected intellectual property right.

7. The apparatus of claim 6 wherein the accepted safe harbor agreement includes a serial number.

8. The apparatus of claim 6 wherein the accepted license agreement includes a serial number.

9. The apparatus of claim 6 comprising making an automated payment to the selected vendor for the given customer's purchase, wherein the vendor database stores instructions for how to make payments to the vendors.

10. The apparatus of claim 6 wherein the vendor database stores a place of residence of each vendor, and the marketplace system program having instructions for including the place of residence of the selected vendor in the copy of the safe harbor agreement and the copy of the license agreement.

* * * * *